United States Patent [19]

Bass

[11] Patent Number: 4,635,442
[45] Date of Patent: Jan. 13, 1987

[54] HYDRAULIC MASTER CYLINDER ASSEMBLY

[75] Inventor: Richard A. Bass, Leamington Spa, England

[73] Assignee: Automotive Products plc, Leamington Spa, England

[21] Appl. No.: 766,269

[22] Filed: Aug. 16, 1985

[30] Foreign Application Priority Data

Aug. 29, 1984 [GB] United Kingdom ............... 8421830

[51] Int. Cl.4 .............................................. B60T 7/02
[52] U.S. Cl. ..................... 60/594; 188/344; 60/584
[58] Field of Search ............. 60/594, 584; 74/522, 74/525; 188/344, 24.15

[56] References Cited

U.S. PATENT DOCUMENTS

| | | | |
|---|---|---|---|
| 2,152,065 | 3/1939 | La Brie | 60/594 |
| 2,741,896 | 4/1956 | Geiger | 60/594 |
| 3,935,930 | 2/1976 | Kine | 60/584 |
| 4,560,049 | 12/1985 | Uchibaba et al. | 188/344 |

FOREIGN PATENT DOCUMENTS 772177 4/1957 United Kingdom .

Primary Examiner—Carroll B. Dority, Jr.
Attorney, Agent, or Firm—Solon B. Kemon

[57] ABSTRACT

This invention relates to hydraulic master cylinder assemblies having a hydraulic master cylinder and an actuating mechanism and in particular to a hydraulic master cylinder assembly in which it is possible to alter the travel ratio between a driver operable actuating lever and a piston of the hydraulic master cylinder. The actuating mechanism includes a lever mechanism interposed between the actuating lever and the piston the effective lever arm length of which can be altered by means of an adjustable member forming part of the lever mechanism.

21 Claims, 8 Drawing Figures

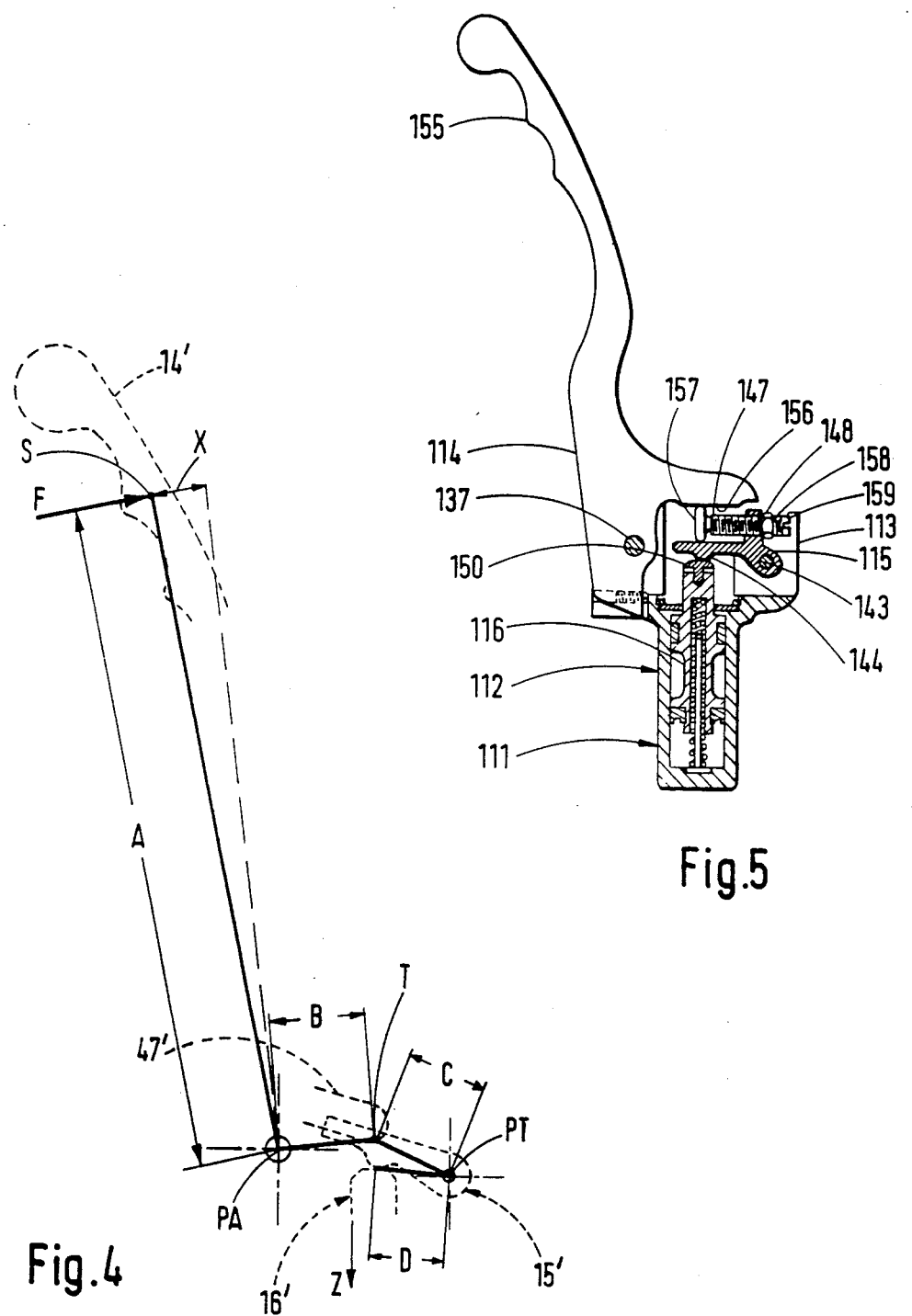

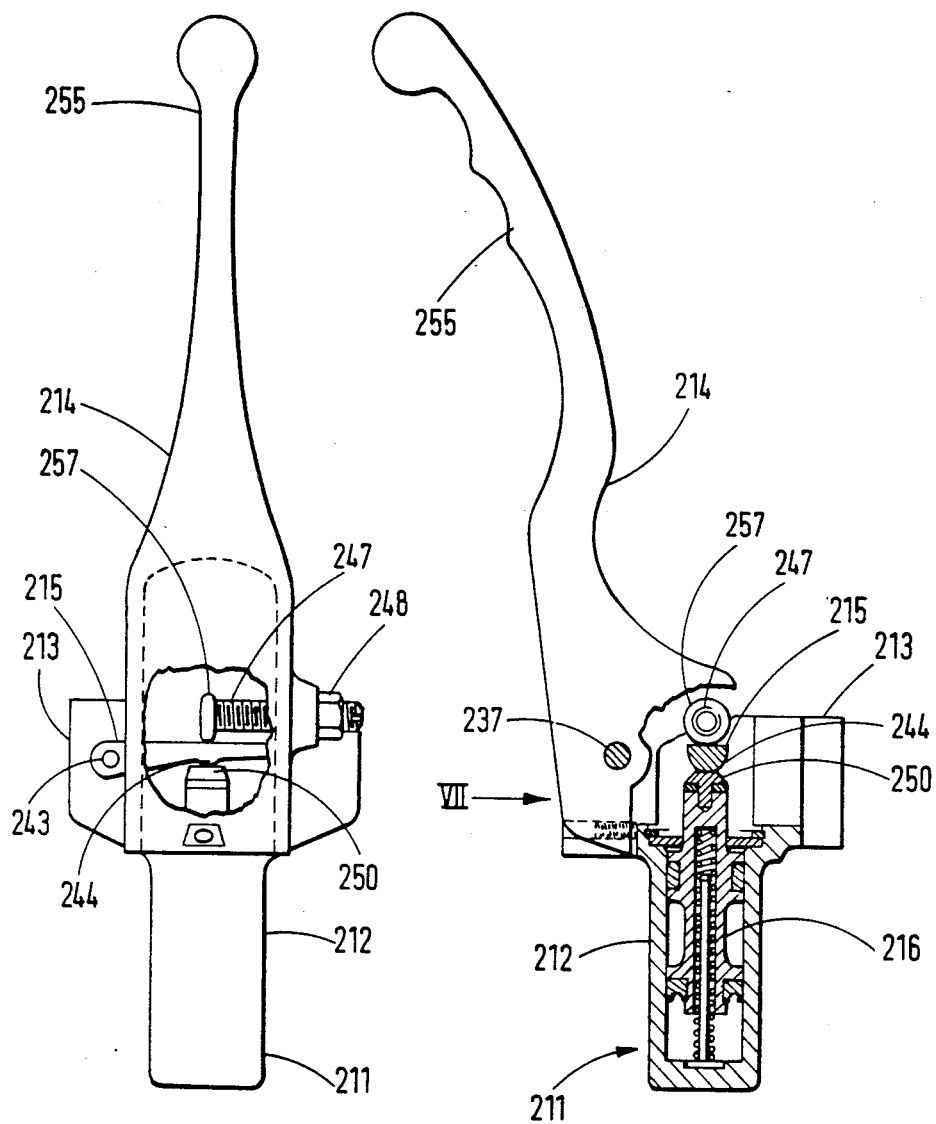

HYDRAULIC MASTER CYLINDER ASSEMBLY

This invention relates to hydraulic master cylinder assemblies and particularly but not exclusively to brake master cylinder assemblies for motorcycles.

It is known to provide a hydraulic master cylinder comprising a hydraulic master cylinder and an actuating mechanism, the hydraulic master cylinder having a piston slidable in a bore in the body of the master cylinder, the actuator level operatively connected to the piston to effect axial movement thereof in response to driver operation of the actuating lever.

The large range of applications for hydraulic master cylinders requires the manufacturer to offer a range of master cylinders of differing bore diameters to accommodate variations in hydraulic system capacity. It is not economically viable to offer a different bore diameter to suit each specific application instead a range of master cylinders is offered in standard sizes. The fact that the ideal bore diameter is not available is not normally a serious drawback and a suitable compromise can often be found. If however, the master cylinder is to be used for a motorcycle braking system it is important that the bore diameter is as close as possible to the ideal size in order to obtain the highest possible efficiency.

In the case of racing motorcycles it is important that the correct diameter master cylinder is used for each application. A motorcycle racing team may well have a range of master cylinders of differing bore diameters for each motorcycle to suit different circuits and weather conditions and variations in rider technique.

It is an object of the invention to provide a master cylinder that can be adjusted to suit a particular installation.

According to the invention there is provided a hydraulic master cylinder assembly comprising a hydraulic master cylinder and an actuating mechanism, the hydraulic master cylinder having a body member defining a bore therein, and being adapted for attachment to part of a vehicle a piston slideably supported in the bore and having an input member for co-operation with part of the actuating mechanism, the actuating mechanism having a driver operated actuating lever and an operative connection to connect the actuating lever to the input member said operative connection including means for altering the travel ratio between the actuating lever and the input member.

Conveniently said operative connection may include a lever mechanism and the means for altering the travel ratio include an adjustable abutment.

Preferably, the lever mechanism includes a transfer lever interposed between the adjustable abutment member and the input member.

Alternatively, the lever mechanism may be formed by the adjustable abutment member and the adjustable member will react directly against the input member.

The invention will now be described by example with reference to the accompanying drawings, in which:

FIG. 4 is a skeletal view similar to FIG. 1 showing the geometrical relationship between the various functional components of the masters assembly shown in FIG. 1;

FIG. 5 is a cross-sectional view similar to that of FIG. 1 but showing a second embodiment of a master cylinder assembly according to the invention;

FIG. 6 is a cross-sectional view similar to that of FIG. 1 but showing a third embodiment of a master cylinder assembly according to the invention;

FIG. 7 is a cut-away view in the direction of arrow VII in FIG. 6;

Figure 1:
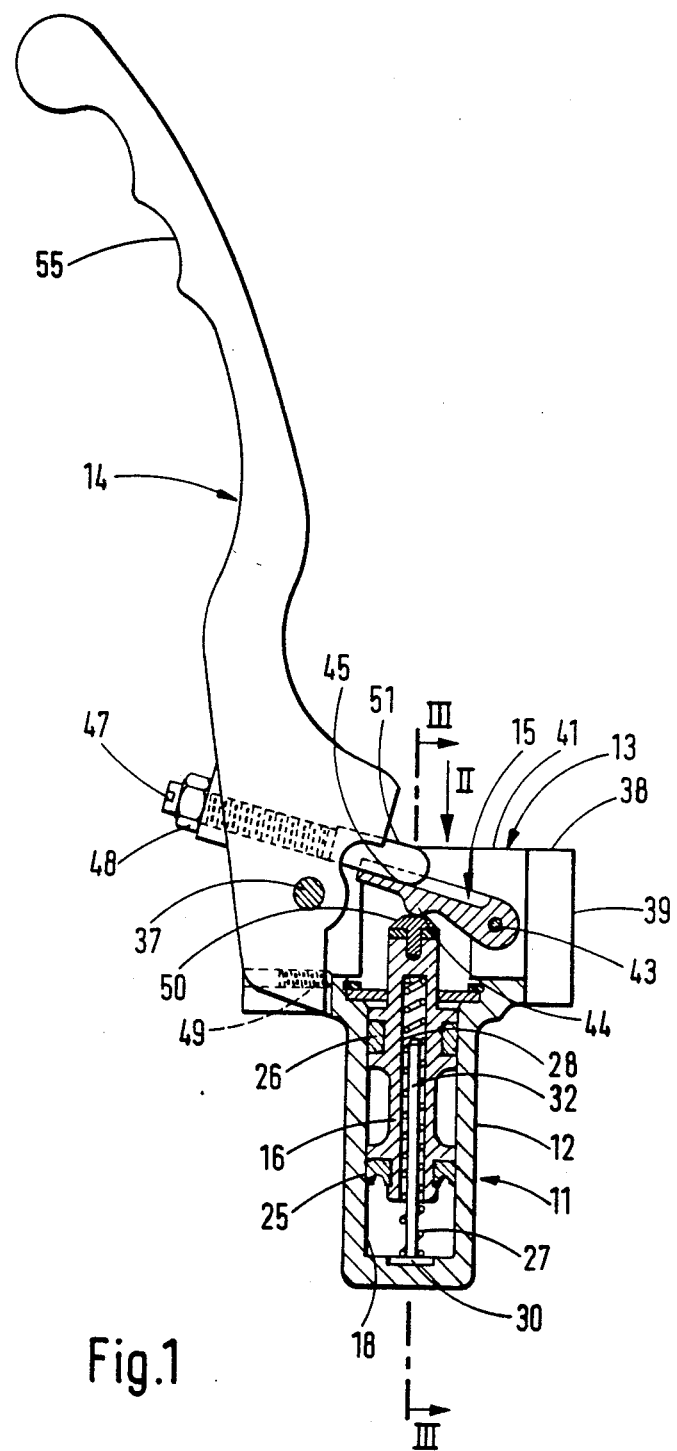
FIG. 1 is a cross section through a first embodiment of a master cylinder assembly according to the invention.

The master cylinder assembly of FIGS. 1 to 4 comprises a hydraulic master cylinder 11 and an actuating mechanism. The hydraulic master cylinder 11 has a body member 12 slideably supporting a piston 16 therein and is adapted by means of a slotted end portion 13 for attaching the master cylinder assembly upon the handlebar (not shown) of a motor cycle. An actuating lever 14 and a transfer lever 15 are pivoted upon the end portion 13 to connect the actuating lever 14 to the piston 16.

The body member 12 defines a bore 18 having an outlet 19 at one end of the bore 18 to which a pipe or hose maybe connected by the screw-threaded aperture 20. A blind screw-threaded bore 21 is provided to co-operate with a bolt 22 securing the reservoir 17 to the body 11. Bypass and reservoir ports 23, 24 are provided to connect the bore 18 to the reservoir 17.

The piston 16 has main and secondary cup seals 25, 26 and a blind bore in one end in which a compression spring 27 is housed to bias the piston 16 away from the outlet 19 and an input member in the form of a wear resistant pad 50 at the other end. A guide pin 32 coaxial with the bore 28 and extending axially through the spring 27 is connected to the body 11 by a plate 30.

The end portion 13 has a part-cylindrical central portion 31 the bore 29 of which is concentric with the bore 18 in the master cylinder portion 12, two parallel flanges 33, 34 each having a through hole 35, 36 in which a pivot pin 37 is secured, and a webbed base portion 38 having a bottom face 39 in which a part-cylindrical slot 40 is formed to cooperate with the handlebar. The end face 41 of the end portion 13 has a slot 42 formed in it into which the transfer lever 15 is located.

The actuating lever 14 is pivotally connected by the pivot pin 37 to the end portion 13 and has a portion away from the pivotal connection that is contoured to provide a comfortable hand grip 55. A rod in the form of a set screw 47 is in threaded engagement with the actuating lever 14. The set screw 47 forms a movable abutment member and is locked into position by a locknut 48. A grub screw 49 is provided to adjust the resting position of the actuating lever 14.

The transfer lever 15 is pivotally supported by a pivot pin 43 secured in the base portion 38 and has a pivot axis arranged to be substantially parallel to the pivot axis of the actuating lever 14. The transfer lever 15 has a convex abutment surface in the form of a lobe 44 for reaction against the pad 50 and a concave abutment surface in the form of the longitudinal groove 45 to co-operate with a part-spherical end portion 51 of the set screw 47.

To operate the master cylinder assembly a driver or rider applies a force to the actuating lever 14 causing it to rotate about the pivot pin 37. The rotation of the actuating lever 14 causes the set screw 47 to react against the transfer lever 15 which rotates about the pivot pin 43.

The lobe 44 transfers the load applied to the transfer lever 15 to the pad so thereby displacing the piston 16 to increase the hydraulic pressure in the hydraulic master cylinder 11.

Figure 2:
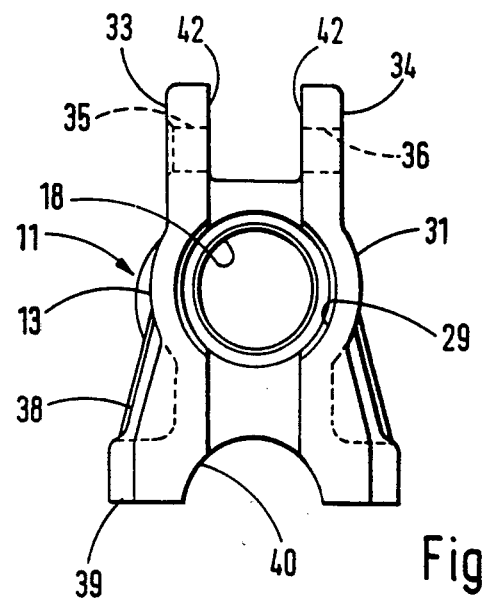
FIG. 2 is an end view in the direction of arrow II in FIG. 1 showing a body member of the master cylinder assembly in FIG. 1.
Figure 3:
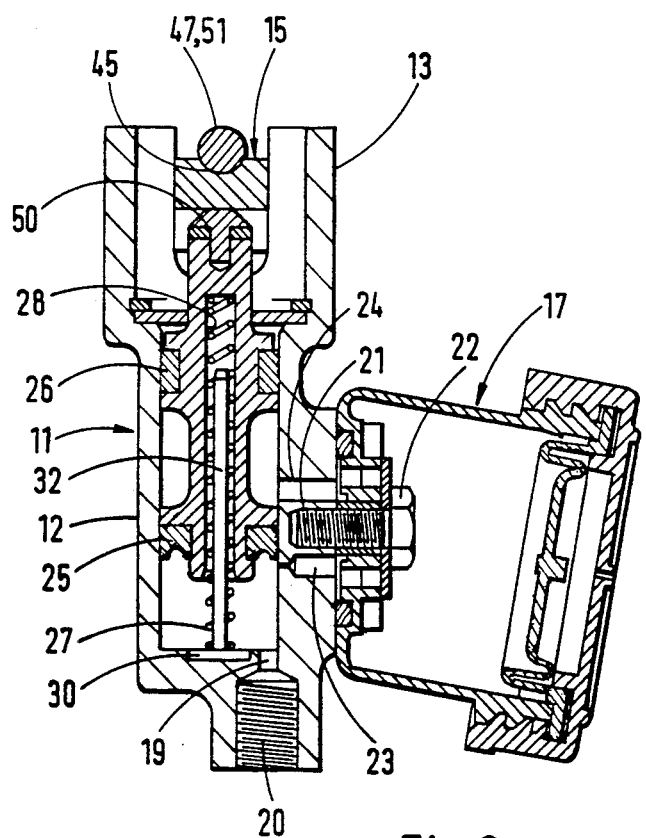
FIG. 3 is a cross-section on the line III—III of the master cylinder assembly of FIG. 1

The travel ratio for the master cylinder assembly is the ratio of the linear movement of the piston 16 obtained for a specified linear displacement of a known point on the actuating lever 14. The known point is the effective position where the applied force acts. The travel ratio of the master cylinder assembly is adjustable by rotating the set screw 47 which will move axially thereby altering its position of contact with the transfer lever 15. If for example, the set screw 43 contacts the transfer lever 15 near to the pivot pine 43 then the travel ratio will be high as a small actuating lever 14 movement will produce a relatively large axial displacement of the piston 16. With reference to FIG. 4 there is shown in skeletal form the master cylinder assembly of FIGS. 1-3 showing in ghosted outline the transfer lever 15' the piston 16' and the actuating lever 14'.

If a force F is applied to the actuating lever 14' by the rider at a distance A from the pivot axis PA (corresponding to point (s) on FIG. 4) causing the point (s) to be angularly displaced equivalent to a linear distance X then it can be shown that the linear displacement Z of the piston 16' is equal to $$Z = X \times (D/C) \times (B/A) \qquad (i)$$

The displacement ration Z/X is therefore equal to $$(D/C) \times (B/A) \qquad (ii)$$

From equation (ii) it can therefore be seen that if the length B is increased the displacement ratio is also increased and if the length B is reduced the displacement ratio is reduced. From FIG. 4 is can also be seen that reducing the length B increases the length C and vice versa. Therefore, increasing the length B not only increases the travel ratio due to its increase in length but also due to the reduction in the length C.

Therefore, it can be seen that by moving the position of abutment(T) of the set screw 47' against the transfer lever 15' the travel ratio can be altered.

The master cylinder assembly of FIG. 5 comprises a hydraulic master cylinder 111 and an actuating mechanism. The hydraulic master cylinder 111 has a body member 112 slideably supporting a piston 116 therein and is adapted by means of an end portion 113 for attaching the master cylinder assembly to part of a vehicle (not shown). The actuating mechanism includes an actuating lever 14. a transfer lever 115 and a set screw 147. The end portion 113 pivotally supports the actuating lever 114 and the transfer lever 115 by means of two press fitted pivot pins 137 and 143 the pivot axes of which are substantially parallel to one another. The actuating lever 114 has a portion away from the pivot pin 137 that is contoured to provide a hand grip 155 and a flat abutment surface 156 for abutment with an adjustable abutment member interposed between the actuating lever 114 and the transfer lever 115. The set screw 147 and the transfer lever 115 form a lever mechanism between the actuating lever 119 and the piston 116.

The adjustable abutment member is in the form of the set screw 147 threadably engaged with the transfer lever 115 and lockable into position by a locknut 148. The set screw has a disc shaped head 157, the outer peripheral surface of which is convex, and a screw-threaded shank 158. The end of the screw-threaded shank 158 away from the head 157 has a slot 159 in it into which a suitable tool can be fitted to rotate the set screw 147.

The transfer lever 115 has a convex abutment surface in the form of the lobe 144 for cooperation with an input member of the master cylinder 112. The input member is in the form of a wear resistent pad 150 attached to an extension of the piston 116. Operation of the master cylinder assembly is substantially as described with reference to FIGS. 1 to 4 and the travel ratio can be similarly altered by moving the set screw 147. Any axial movement of the set screw 147 will have a two-fold effect on the travel ratio. For example, if the distance between the position of contact of the set screw 147 against the actuating lever 114 and the pivot axis of the actuating lever 114 is increased this will reduce the distance between the position of contact of the set screw 147 against the actuating lever 114 and the pivot axis of the transfer lever 115.

The master cylinder assembly shown in FIGS. 6 and 7 is similar in many respects to that shown in FIGS. 1 to 4 and part similar to those described with respect to FIGS. 1 to 4 have the same reference numerals with the addition of 200.

The master cylinder assembly comprises a hydraulic master cylinder 211 and an actuating mechanism. The hydraulic master cylinder 211 having a body member 212 and an end portion 213 for attaching the master cylinder assembly to part of a vehicle (not shown). The body member 212 defines a bore therein in which a piston 216 is slideably supported.

The actuating mechanism includes an actuating lever 214 a transfer lever 215 and a set screw 247. The end portion 213 pivotally supports the actuating lever 214 and the transfer lever 215 by means of two press-fitted pivot pins 237 and 243. The pivotal axis of the actuating lever 214 and the transfer lever 125 are perpendicularly arranged with respect to one another. The transfer lever 215 and the set screw 247 form a lever mechanism between the actuator lever 214 and the piston 216. The actuating lever 214 has a portion away from the pivot pin 237 that is contoured to provide a hand grip 255. The set screw 247 is in threaded engagement with the actuating lever 214 to provide an adjustable abutment member between the actuating and transfer levers 214 and 215. The set screw 247 is lockable in position by a lock nut 248 and has a disc shaped head 257 the outer peripheral surface of which is convex.

The transfer lever 215 has a convex abutment surface in the form of a lobe 244 for co-operation with an input member of the master cylinder and a flat surface for abutment with the head 257. The input member of the master cylinder is in the form of a wear resistant pad 250 attached to an extension of the piston 216.

To operate the master cylinder assembly a driver or rider applies a force to the actuating lever 214 at or near the hand grip 255 causing the actuating lever 214 to rotate about the pivot pin 237. The rotation of the actuating lever 214 is transmitted to the transfer lever 215 by the set screw 247 causing the transfer lever 215 to rotate about the pivot pin 243. The movement of the transfer lever 215 is transmitted to the piston 216 through the abutment of the lobe 244 with the pad 250.

To alter the travel ratio between the actuating lever 214 and the piston 216 the set screw 247 is rotated, thereby altering the distance between its position if abutment with the transfer lever 215 and the pivotal axis of the transfer lever 215. It should be appreciated that the longitudinal axis of the set screw is substantially parallel to the pivotal axis of the actuating lever 214 and so no variation in the distance between the pivotal axis of the actuating lever 214 and the position of abutment of the set screw 247 against the transfer lever 215 will occur when the set screw 247 is rotated to alter the travel ratio. Therefore, unlike the first and second embodiments previously described the change in travel ratio is due entirely to the variation in the distance of the position of abutment of the set screw 247 against the transfer lever 215 from the pivotal axis of the transfer lever 215.

Figure 8:
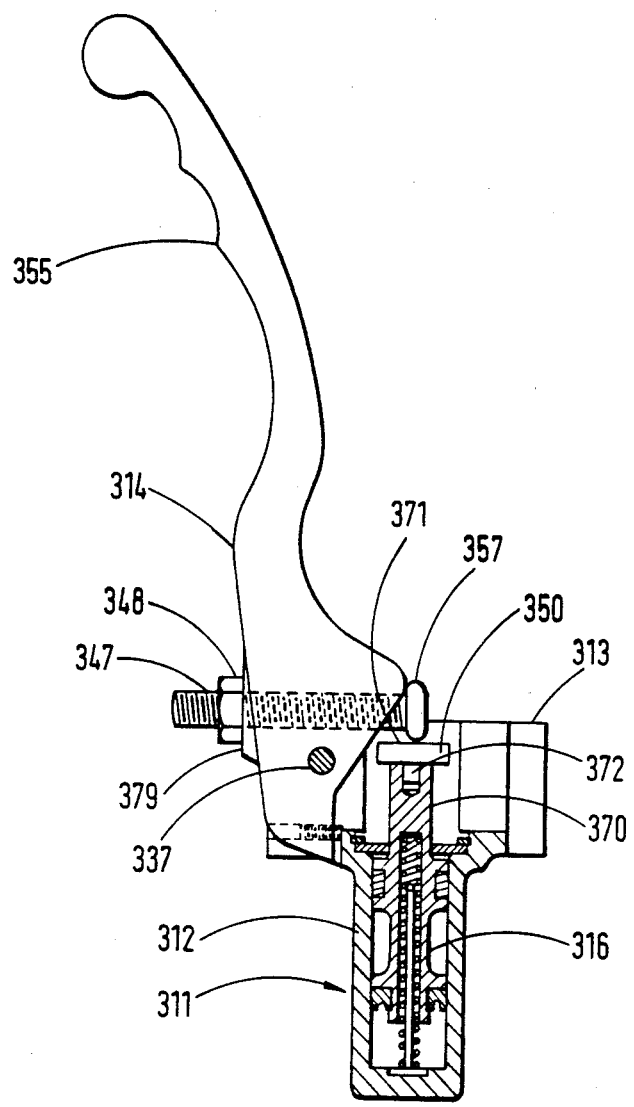
FIG. 8 is a cross-sectional view similar to that of FIG. 1 but showing a fourth embodiment of a master cylinder assembly according to the invention.

In a fourth embodiment of the invention shown in FIG. 8 the master cylinder assembly is substantially the same as that described with reference to FIGS. 1 to 4 and parts similar to those described with respect to FIGS. 1 to 4 have the same reference numerals with the addition of 300.

The master cylinder assembly comprises a hydraulic master cylinder 311 and an actuating mechanism. The hydraulic master cylinder 311 has a body member 312 and an end portion 313 for attaching the master cylinder assembly to part of a vehicle (not shown).

The body member 312 pivotally supports a press-fitted pivot pin 337. The actuating mechanism includes the actuating lever 314 and a set screw 347. The actuating lever 314 has a screw threaded boss portion 379 and a portion away from its pivotal axis that is contoured to provide a hand grip 355. The set screw 347 is threaded into the boss portion 379 to provide both a lever mechanism and a movable abutment member between the actuating lever 314 and the piston 316. The set screw 347 is lockable in position by a lock nut 348 and has a disc shaped head 357, the outer peripheral of which is convex.

The head 357 of the set screw 347 abuts directly against a wear resistance pad 350 attached to an extension 370 of the piston 216. The pad 350 forms an input member of the master cylinder and has a flat face 371 for co-operation with the head 357 and a stem 372 used to attach the pad 350 to the extension 370.

To operate the master cylinder a force is applied to the actuating lever 314, as previously described, causing it to rotate about the pivot pin 337. The rotation of the actuating lever 314 moves the set screw 347 against the pad 350 thereby displacing the piston 316.

The travel ratio, that is to say the ratio of actuating lever 314 movement ot piston 316 movement can be seen to be equal to the ratio between the effective length of the actuating lever 314 and the distance of the position of abutment of the set screw 347 agains the pad 350 from the pivotal axis of the actuating lever 314. Therefore, by axially moving the set screw 347 the displacement ratio can be altered as the distance of the position of abutment of the set screw 347 against the pad 350 will be changed with respect to the pivotal axis of the actuating lever 314.

Although the invention has been described with reference to a hand operated brake master cylinder for a motorcycle it is envisaged that it could be a foot operated master cylinder or a clutch master cylinder operated by either foot or hand.

Similarly, although the moveable abutment has been described as a set screw attached to the actuating lever or transfer lever any device which allows the position of abutment of the actuating lever with the transfer lever or piston could be used.

It is an advantage of the invention that a large range of master cylinder capacities can be provided by a small number of different bore diameters. Such a facility is very advantageous from an economy of manufacture view point.

It is a further advantage of the invention that it is possible to obtain exactly the right master cylinder capacity with a small range of different bore diameters.

It is especially advantageous for use on racing motorcycles or cars that the travel ratio can be adjusted without removing the master cylinder assembly from the vehicle.

I claim:

1. A hydraulic master cylinder assembly comprising a hydraulic master cylinder and an actuating mechanism, the hydraulic master cylinder having a body member defining a bore therein and being adapted for attachment to part of a vehicle, a piston slideably supported in the bore, and an input member of the piston for co-operation with part of the actuating mechanism, the actuating mechanism having a driver operated actuating lever and an operative connection to connect the actuating lever to the input member said operative connection including means for altering the travel ratio between the actuating lever and the input member.

2. An assembly as claimed in claim 1 in which said operative connection further includes a lever mechanism and said means for altering the travel ratio includes an adjustable abutment.

3. An assembly as claimed in claim 2 in which said lever mechanism includes a transfer lever interposed between the adjustable abutment member and the input member.

4. An assembly as claimed in claim 3 in which the transfer lever is pivotally supported by the body member.

5. An assembly as claimed in claim 2 in which the actuating lever is pivotally supported by the body member.

6. An assembly as claimed in claim 4 in which the actuating lever is pivotally supported by the body member.

7. An assembly as claimed in claim 6 in which the pivot axis of the transfer lever is substantially parallel to the pivot axis of the actuating lever.

8. An assembly as claimed in claim 7 in which the adjustable abutment member is a rod supported by the actuating lever.

9. As assembly as claimed in claim 8 in which the rod is a set screw in threaded engagement with the actuating lever.

10. An assembly as claimed in claim 3 in which the transfer lever has convex abutment surface for co-operation with the input member.

11. An assembly as claimed in claim 7 in which the transfer lever has a convex abutment surface for co-operation with the input member.

12. An assembly as claimed in claim 8 in which the transfer lever has a convex abutment surface for abutment with the input member and a longitudinal groove to co-operate with the rod.

13. An assembly as claimed in claim 7 in which the adjustable abutment member is supported by the transfer lever.

14. An assembly as claimed in claim 13 in which the movable abutment member is a set-screw.

15. An assembly as claimed in claim 6 in which the pivot axis of the transfer lever is substantially perpendicular to the pivot axis of the actuating lever.

16. An assembly as claimed in claim 15 in which the adjustable abutment member is movable axially along an axis arranged substantially parallel to the pivot axis of the actuating lever.

17. An assembly as claimed in claim 16 in which the movable abutment member is a set-screw.

18. An assembly as claimed in claim 2 in which the movable abutment member is supported by the actuating lever.

19. An assembly as claimed in claim 18 in which the adjustable abutment member reacts directly against the input member and forms said lever mechanism.

20. An assembly as clamed in claim 19 in which the movable abutment member is a set-screw in threaded engagement with actuating lever.

21. An assembly as claimed in claim 20 in which the set screw has a part spherical end portion for abutment against the input member.

* * * * *